(12) United States Patent
Tuin et al.

(10) Patent No.: US 10,852,489 B1
(45) Date of Patent: Dec. 1, 2020

(54) HIGH DENSITY OPTICAL TRANSCEIVER ASSEMBLY

(71) Applicant: TE Connectivity Nederland B.V., 's-Hertogenbosch (NL)

(72) Inventors: Jacobus Nicolaas Tuin, Best (NL); Sander Johannes Floris, Lennisheuvel (NL); Rutger Wilhelmus Smink, Hamont-Achel (BE); Alexander Dorrestein, Helmond (NL)

(73) Assignee: TE Connectivity Nederland B.V.

( * ) Notice: Subject to any disclaimer, the term of this patent is extended or adjusted under 35 U.S.C. 154(b) by 0 days.

(21) Appl. No.: 16/450,264

(22) Filed: Jun. 24, 2019

(51) Int. Cl.
| | |
|---|---|
| *G02B 6/38* | (2006.01) |
| *G02B 6/42* | (2006.01) |
| *H01R 13/66* | (2006.01) |
| *G02B 6/43* | (2006.01) |
| *H01R 12/70* | (2011.01) |
| *H01R 12/72* | (2011.01) |

(52) U.S. Cl.
CPC ........... *G02B 6/3897* (2013.01); *G02B 6/421* (2013.01); *G02B 6/428* (2013.01); *G02B 6/4284* (2013.01); *G02B 6/4292* (2013.01); *G02B 6/43* (2013.01); *H01R 12/7076* (2013.01); *H01R 12/721* (2013.01); *H01R 13/6658* (2013.01)

(58) Field of Classification Search
CPC .... G02B 6/3897; G02B 6/4201; G02B 6/421; G02B 6/423; G02B 6/428; G02B 6/4219; G02B 6/4228; G02B 6/4243; G02B 6/4245; G02B 6/4249; G02B 6/426; G02B 6/4269; G02B 6/4284; G02B 6/4292; G02B 6/43; H01R 12/7076; H01R 12/721; H01R 13/6658
USPC ........................................ 385/14, 53, 88–94
See application file for complete search history.

(56) References Cited

U.S. PATENT DOCUMENTS

| | | | |
|---|---|---|---|
| 9,063,306 B2* | 6/2015 | Little | G02B 6/4269 |
| 9,196,985 B2 | 11/2015 | Miller et al. | |
| 9,857,544 B2 | 1/2018 | Tuin et al. | |
| 2011/0222861 A1* | 9/2011 | Pitwon | G02B 6/4214 |
| | | | 398/116 |
| 2017/0017052 A1 | 1/2017 | Costello | |

* cited by examiner

*Primary Examiner* — Michael P Mooney

(57) ABSTRACT

A transceiver assembly for mounting on a mother board, said transceiver assembly comprising: (a) a frame defining a first plane configured for mounting parallel to said motherboard, said frame defining a plurality of slots perpendicular to said first plane; and (b) one or more opto-electric cards, each of said one or more opto-electric cards disposed in one of said plurality of slots and comprising at least, (i) a substrate having a first edge parallel to said first plane when said opto-electric card is mounted in said slot, (ii) an electrical interface along said first edge, (iii) and an interposer electrically connected to said electrical interface and comprising at least one optical component operatively connected to said electrical interface, and (iv) at least one optical fiber extending freely from said interposer.

9 Claims, 5 Drawing Sheets

HIGH DENSITY OPTICAL TRANSCEIVER ASSEMBLY

FIELD OF INVENTION

The present invention relates, generally, to an optical transceiver, and, more specifically, to a scalable, high-density, optical transceiver assembly with its channels distributed among discrete opto-electric cards.

BACKGROUND

A fiber optic transceiver is a device that sends and receives data over optical fibers. The transceiver has active components (i.e., optical components) to condition and encode/decode data between light pulses and electrical signals. As with most devices, there are many kinds and models of transceivers available, which range in size, performance and price.

Conventional optical transceivers have their active components mounted on a carrier or interposer. This interposer is, in turn, mounted on a larger printed circuit board (PCB) of the device. The device is configured for mounting to a motherboard with the device PCB parallel to the motherboard. One such device is shown in FIG. 6. Transceiver 600 comprises transmitter 601 and receiver 606 interposers mounted on a device PCB 602. Optical fibers 603 extend from the interposer 601. A frame 603 houses the device PCB, and, as shown, comprises ears 605 having fastener openings 604 for mounting the transceiver to a motherboard (not shown). When mounted, the device PCB is parallel to the motherboard. Although this conventional transceiver has been commercialized with significant success, Applicant recognizes a significant shortcoming in the orientation of the device PCB to the motherboard. Specifically, the orientation of the device PCB consumes valuable real estate on the motherboard. Furthermore, as the number of devices on the motherboard increases to meet the demand for additional channels, the consumption of valuable motherboard space is exacerbated.

Although conventional high-density transceivers are commercially available, these devices typically integrate many channels onto common interposer/device PCB. Not only are such devices often prohibitively expensive, but also they tend to be susceptible to single-point failure given the integration of multiple channels on a single PCB. In other words, if a single light emitting device or photodiode fails, then the entire device may need to be replaced.

Accordingly, Applicant has identified the need for a high-density transceiver, which is not susceptible to single-point failures. The present invention fulfills this need among others.

SUMMARY

The following presents a simplified summary of the invention to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, present invention relates to a transceiver assembly for mounting on a mother board, said transceiver assembly comprising: (a) a frame defining a first plane configured for mounting parallel to said motherboard, said frame defining a plurality of slots perpendicular to said first plane; and (b) one or more opto-electric cards, each of said one or more opto-electric cards disposed in one of said plurality of slots and comprising at least, (i) a substrate having a first edge parallel to said first plane when said opto-electric card is mounted in said slot, (ii) an electrical interface along said first edge, (iii) and an interposer electrically connected to said electrical interface and comprising at least one optical component operatively connected to said electrical interface, and (iv) at least one optical fiber extending freely from said interposer.

BRIEF DESCRIPTION OF DRAWINGS

FIG. 6 shows a conventional transceiver used in the transceiver configuration of FIG. 5a.

DETAILED DESCRIPTION

Figure 1:
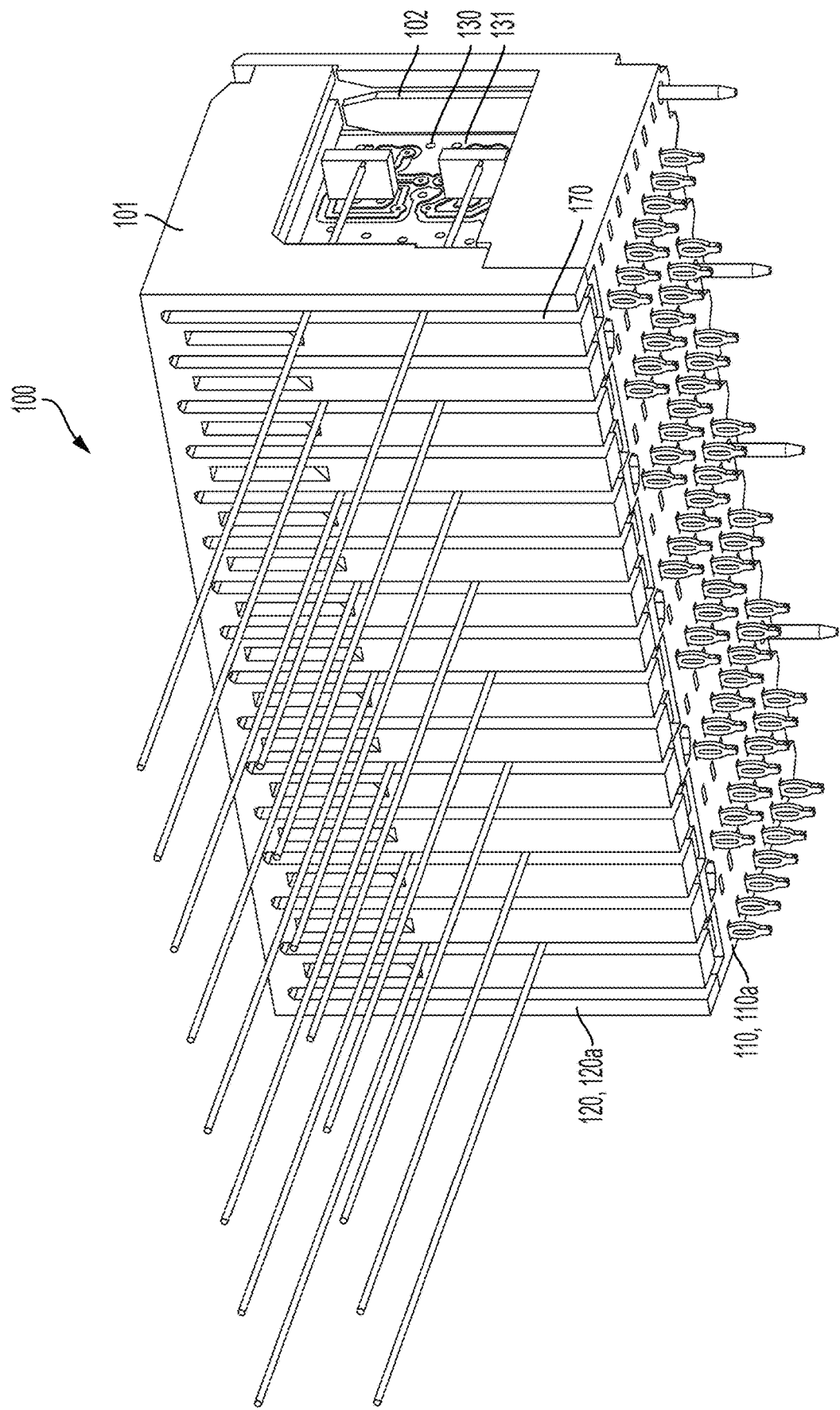
FIG. 1 shows a perspective view of one embodiment of the transceiver assembly of the present invention.
Figure 2:
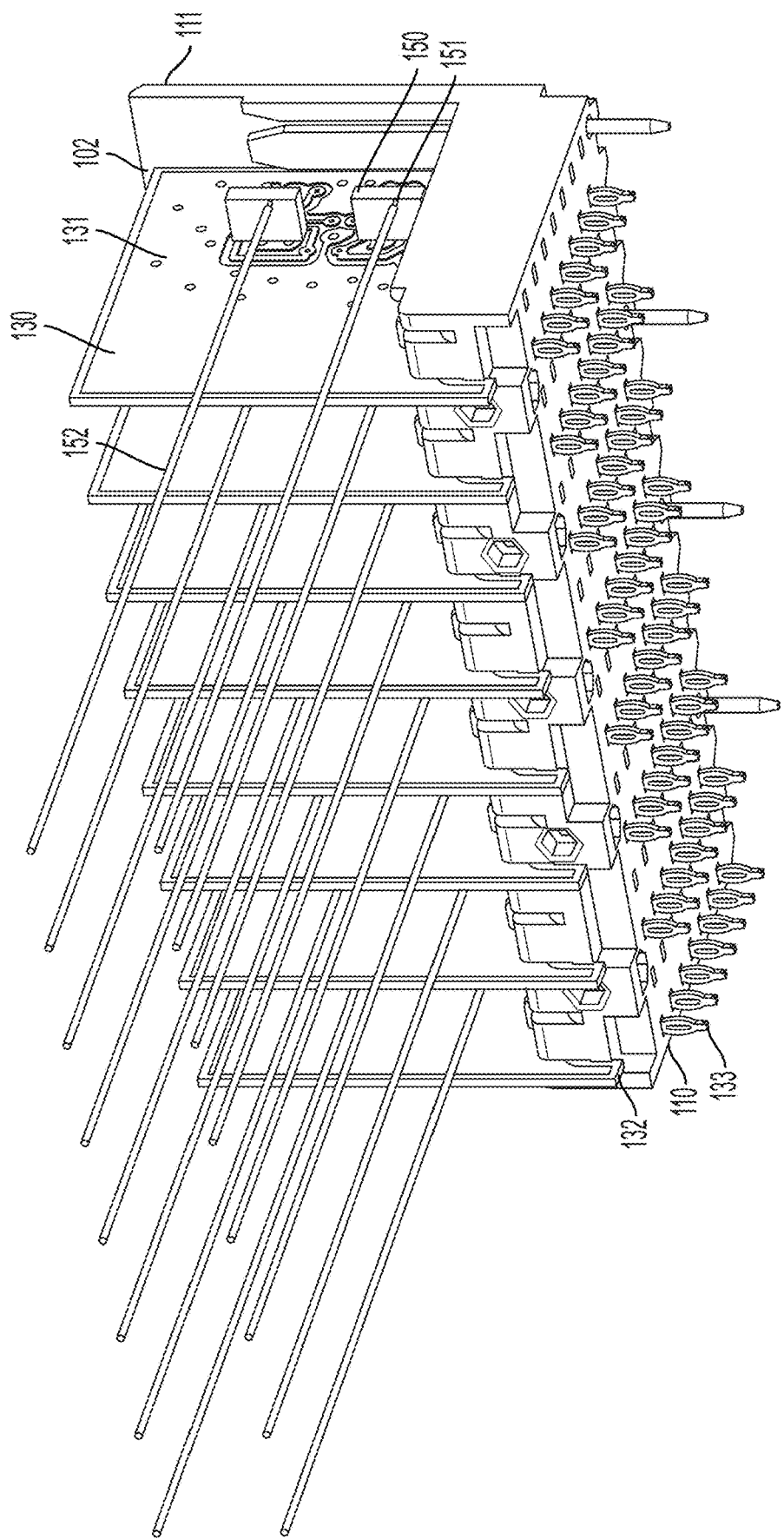
FIG. 2 shows the transceiver assembly of FIG. 1 with a portion of the frame removed.
Figure 4:
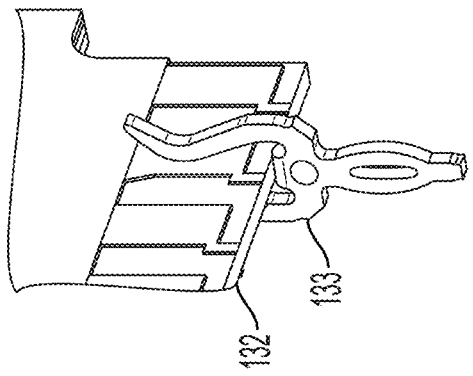
FIG. 4 shows a close-up view of the electrical interface of the opto-electric card of FIG. 3.

Referring to FIGS. 1-4, one embodiment of the transceiver assembly 100 of the present invention is disclosed. The transceiver assembly 100 is configured for mounting on a motherboard (not shown). The transceiver assembly 100 comprises a frame 101 defining a first plane 110 configured for mounting parallel to the motherboard. The frame 100 defines a plurality of slots 102 perpendicular to the first plane. One or more opto-electric cards 130 are disposed in the transceiver assembly—each opto-electric card being disposed in one of the plurality of slots. Each opto-electric card comprises at least a substrate 131 essentially perpendicular to the first plane when the opto-electric card is mounted in a slot of the frame, a first edge 132 parallel to the first plane when the opto-electric card is mounted in the slot, an electrical interface 133 along the first edge, and an interposer 150 electrically connected to the electrical interface. The interposer comprises at least one optical component 151 operatively connected to the electrical interface. At least one optical fiber 134 extends freely from the interposer.

Each of these elements/features are described in detail below in connection with alternative selective selected inter alternative embodiments.

a. Modular Opto-Electric Cards

In one embodiment, the transceiver assembly comprises discrete/modular opto-electric cards 130. In one embodiment, each discrete opto-electric card is releasably engageable with the frame 101. In one embodiment, the frame 101 comprises a plurality of slots 102 and each opto-electric card 130 is slidably engageable with one of the slots. Generally, each opto-electric card comprises one or more optical elements for transmitting/receiving electrical/optical signals, although it should be understood that an opto-electric card may be a dedicated optical receiver, or a dedicated optical transmitter. In this respect, the modular configuration of the opto-electric card allows for a given transceiver assembly to be configured in different ways. For example, a transceiver assembly may comprise a portion of opto-electric cards configured for transceiving, and another portion of opto-electric cards dedicated to receiving and/or transmitting, depending on the application.

Not only does the modularity of the opto-electric card provide flexibility in constituting the transceiver assembly with transceiving/transmitting/receiving opto-electric cards, but also provides for scalability. That is, rather than purchasing and installing a transceiver assembly with its full complement of channels, in one embodiment, the transceiver assembly of the present invention may be scaled up to meet the demands of the application. For example, initially, a transceiver frame with relatively few opto-electric cards may be installed, and, later, additional opto-electric cards may the added to the frame as the demand for additional channels grows. Thus, in one embodiment, the transceiver assembly of the present invention provides for a pay-as-you-grow solution.

The electrical interface between the transceiver assembly and the motherboard is also scalable. That it, in one embodiment, the electrical interface is part of the discrete opto-electric card and not part of the frame, thus, limiting the electrical interface to just those opto-electric cards being used. More specifically, in one embodiment, the frame has openings along the first plane to accommodate the electrical interface of the opto-electric card such that the electrical interface passes through the frame for connection to the motherboard. For example, referring to FIGS. 3-4, the opto-electric card 130 comprises eye-of-the-needle connectors 133 along the first edge 132. (Such connectors are well known and will not be described herein in detail.) Thus, one benefit of this embodiment is an electrical interface that is sized to the channels being used (i.e., a single-use fixed connection).

Although a discrete electrical interface may be used with the opto-electric cards, other embodiments exist. For example, rather than a discrete eye-of-the-needle at the electrical interface of the cards, a disconnectable electrical interface might be applied, such as the disconnectable interface of the 'Multigig' connector (between header and receptacle) disclosed in U.S. Pat. No. 9,196,985. By doing so, a dense multi-lane "active optical cable" can be realized. For example, a connector body may be configured that plugs into the connector frame 101. The connector body may house optoelectronics cards, making the entire assembly mateable. The only connections are the electrical pins in the connector body—all of the active components are essentially built in or hidden in the connector body.

Another benefit of the modular configuration of the opto-electric card is the ability to replace defective opto-electric cards or to upgrade opto-electric cards periodically without having to replace the entire transceiver assembly. In other words, unlike a conventional transceiver in which the entire transceiver must be replaced if one or more channels become inoperable, just the inoperable or out-of-date opto-electric card needs to be replaced in one embodiment of the transceiver assembly. Thus, the modular configuration of the opto-electric cards eliminates single-point failures of the entire transceiver assembly. Moreover, the discrete opto-electric card solution of the present invention enables a configurable ratio of channel protection. More specifically, the scalable configuration of the present invention enables the user to configure precisely the level of channel protection desired—e.g. from 1:1 redundancy to 1:N redundancy—rather than having to provide an entire, singular redundant multichannel transceiver (e.g., 12 channel device) at a greater initial and replacement cost.

b. High-Density Channels

In one embodiment, the opto-electric cards are arranged essentially perpendicular to the first plane of the frame, and, thus, perpendicular to the motherboard on which the frame is mounted. For example, referring to FIG. 1, in one embodiment, the transceiver assembly defines an electrical face 110a along the first plane 110, and an optical face 120a along a second plane 120, perpendicular to the first plane, through which the fibers extend. Although FIG. 1 shows just a single optical face from which the fibers extend, it should be understood that other embodiments exist. For example, the fibers may be configured to extend from any face and/or direction from the transceiver assembly. Indeed, by having the cards extend perpendicularly from the first plane (and motherboard), the fibers are free to extend from the transceiver assembly in all directions, as discussed below.

Figure 5A:
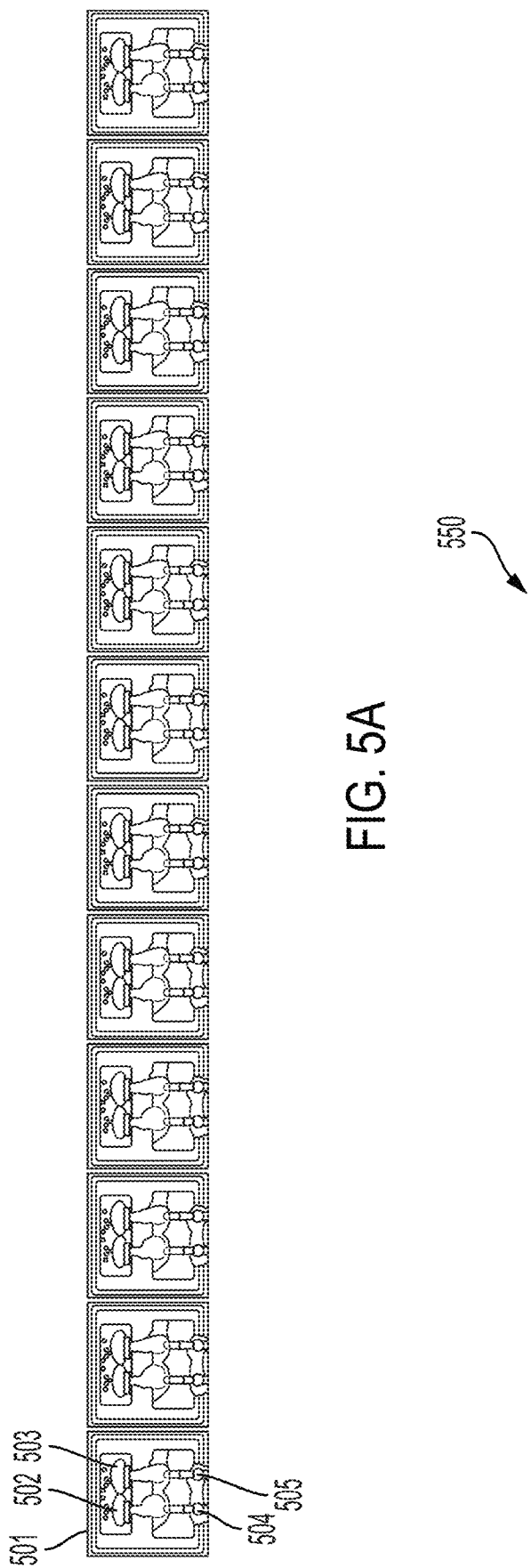
FIGS. 5a and 5b show a comparison between a conventional 12 channel transceiver configuration and one embodiment of a 12-channel transceiver assembly of the present invention.
Figure 5B:
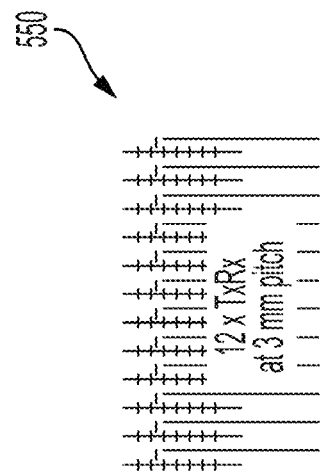
Figure 6:
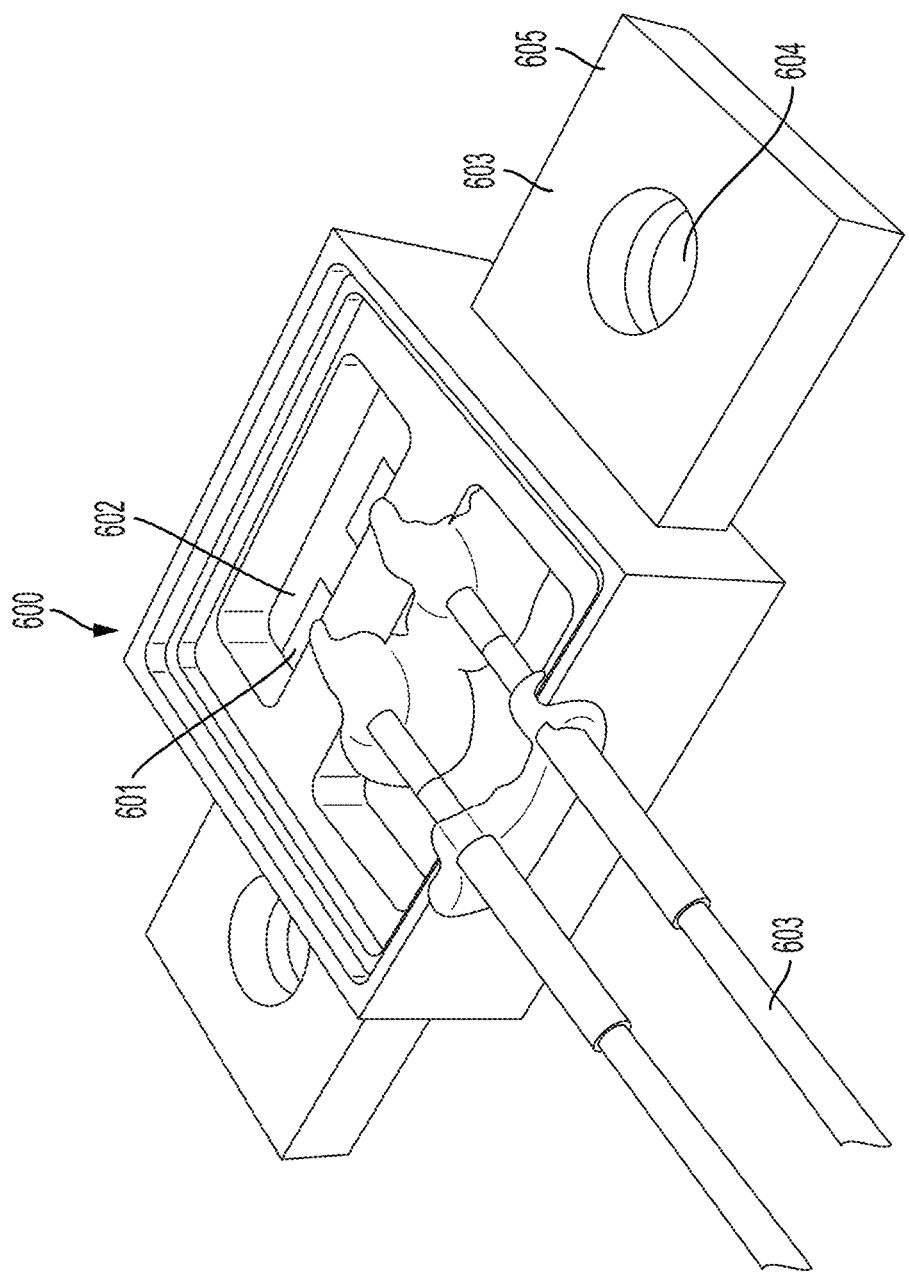

Such a configuration facilitates high-density channels. That is, by minimizing the real estate on the motherboard and instead arranging the opto-electric cards perpendicular to the motherboard, a channel density is achieved which far exceeds conventional approaches. For example, FIG. 5a shows a traditional transceiver package 501 having transmit and receive optical components 503, 503, and associated fibers, 504, 505. Each package 501 has a footprint of about 14.5×14.1 mm (i.e. a width of about 14.5 mm and a depth of about 14.1 mm) with the ears removed (see FIG. 6). When arranged in a 12-channel linear array, as shown in the embodiment of FIG. 5a, the pitch between packages is about 14.5 mm, thus resulting in a footprint of 174×14.1 mm (i.e., a width of about 174 mm and a depth of about 14.1 mm). On the other hand, FIG. 5b shows one embodiment of the transceiver assembly 550. For the same number of channels (12), it has a dramatically smaller footprint-36×13.5 mm (i.e. a width of 36 mm and a depth of 13.5 mm). This equates to less than ⅕ the area of the conventional transceiver array of FIG. 5a. Thus, the transceiver assembly of the present invention, in one embodiment, facilitates high-density channel configurations which minimizes consumption of precious real estate on the motherboard.

In one embodiment, the perpendicular (vertical) mounting and stacking of the opto-electric cards can be re-used from an existing connector design, for example, the "Multigig" connector. Moreover, U.S. Pat. No. 9,196,985 discloses an implementation of this connector in which active components are mounted on the PCBs. In a similar way, the optical components may be mounted to the opto-electric cards.

c. Freely-Extending Optical Fibers

Figure 3:
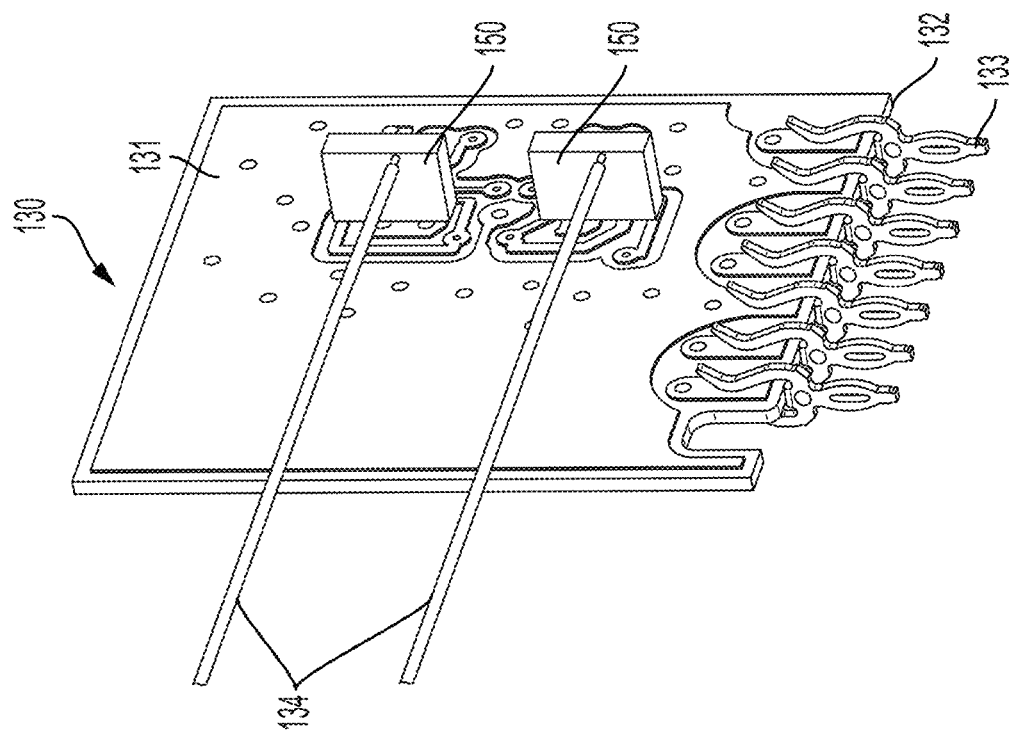
FIG. 3 shows an individual opto-electric card of the transceiver assembly of FIG. 1.

In one embodiment, the opto-electric card 130 of the present invention is configured with fibers 124 that freely extend from interposers 150 of the opto-electric card 130 as shown in FIG. 3. Such an embodiment provides flexibility in routing the fibers to and from the transceiver assembly. Specifically, because the fibers extend freely from the transceiver assembly, there is no need for complicated/restrictive fan-out assemblies or boots as conventionally used. Instead, the freely-extending fibers may be routed in any direction desired. For example, certain fibers may be led to one trunk while others may be split off to another trunk. In one embodiment, the fibers of opto-electric cards are routed to different locations—e.g. to different switches, servers, access points, mux equipment, etc.

Moreover, the fibers extending from the transceiver assembly may be any size desired such that longer fibers may be terminated to other devices without the need for splices and/or connector connections. In this respect, the modularity of the opto-electric cards may be combined with the freely-extending fiber to provide opto-electric cards that are configurable for particular fiber length. For example, in one embodiment, the opto-electric cards may have different fiber length extending from them—e.g., short, medium, and long—such that the transceiver assembly may be constituted with opto-electric cards having different fiber lengths as needed.

In one embodiment, the frame 101 defines a number of openings 170 on the face of the transceiver assembly 100 as shown in FIG. 1 through which the fibers may pass. Although this embodiment channels the fibers to a common face of the transceiver assembly, other embodiments are possible. For example, in one embodiment, the frame comprises openings on two or more faces allowing the fibers to extend from the transceiver assembly in different directions. Still other embodiments will be obvious to those of skill in the art in light of this disclosure.

d. Interposer

In one embodiment, the opto-electric cards comprise an innovative interposer that minimizes hysteresis and simplifies optical alignments. One embodiment of the interposer of the present invention is disclosed, for example, in pending U.S. patent application Ser. No. 16/450,189, hereby incorporated by reference in its entirety. In one embodiment, the interposer 150 is perpendicular to the opto-electric card substrate 131 as shown in FIG. 3. Such an embodiment has a number of advantages as described in the aforementioned application. In one embodiment, the interposer is disposed mid-board, thereby reducing the length of traces which increase impedance/hysteresis. In one embodiment, the interposer is part of an onboard optical module mounted to the opto-electric card.

In one embodiment, the interposer integrates both the optical component and the chip. As used herein, the optical component may be any known or later-developed component that can be optically coupled to an optical conduit as described below. The optical component may be for example: (a) an opto-electric device (OED), which is an electrical device that sources, detects and/or controls light (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); photodiodes, such as P Intrinsic N (PIN) and avalanche photodiode (APD); photonics processor, such as, a CMOS photonic processor, for receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips)); or (b) a hybrid device which does not convert optical energy to another form but which changes state in response to a control signal (e.g., switches, modulators, attenuators, and tunable filters). It should also be understood that the optical component may be a single discrete device, or it may be assembled or integrated as an array of devices. In one embodiment, the optical component is a surface emitting light source. In one embodiment, the surface emitting light source is a VCSEL. In one embodiment, the optical component is photo sensitive. In one embodiment, the photo sensitive optical component is a photodiode.

In one embodiment, the optical component works in conjunction with one or more electronic chips. A chip as used herein refers to any electronic/semiconductor chip needed to facilitate the function of the optical component. For example, if the optical component is a transmitter, then the chip may be a driver, or, if the optical component is a receiver, then the chip may be a transimpedance amplifier (TIA). The required chip for a given optical component is well known in the art will not be described here in detail.

Although integrating the chip with optical component on the interposer is beneficial and often preferred, it is not necessary, and, in some embodiments, the chip may be disposed on the opto-electric card substrate 131.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A transceiver assembly for mounting on a mother board, said transceiver assembly comprising:
   a frame defining a first plane configured for mounting parallel to said motherboard, said frame defining a plurality of slots perpendicular to said first plane; and
   one or more opto-electric cards, each of said one or more opto-electric cards disposed in one of said plurality of slots and comprising at least,
      a substrate having a first edge parallel to said first plane when said opto-electric card is mounted in said slot,
      an electrical interface along said first edge,
      and an interposer electrically connected to said electrical interface and comprising at least,
      one optical component operatively connected to said electrical interface, and
   at least one optical fiber extending freely from said interposer.

2. The transceiver assembly of claim 1, wherein said one or more opto-electric cards comprises a plurality of opto-electric cards.

3. The transceiver assembly of claim 1, wherein said each of said one or more opto-electric cards is releasably engaged with said frame.

4. The transceiver assembly of claim 3, wherein said each of said one or more opto-electric cards is slidably engaged with said frame.

5. The transceiver assembly of claim 1, wherein said frame defines an electrical face presenting said electrical interface of said each of said one or more opto-electric cards, and an optical face from which extends said at least one optical fiber of said each of said one or more opto-electric cards, said electrical and optical faces being perpendicular.

6. The transceiver assembly of claim 1, wherein said interposer is part of an optical module mounted on said substrate.

7. The transceiver assembly of claim 1, further comprising a chip for interfacing between said optical component and said electrical interface.

8. The transceiver assembly of claim 1, wherein said chip is disposed on said interposer.

9. The transceiver assembly of claim 1, wherein said chip is disposed on said substrate.

* * * * *